INVENTOR.
HERMANN C. SCHUTT

INVENTOR.
HERMANN C. SCHUTT
BY
Morgan, Finnegan, Durham + Pine
ATTORNEYS.

INVENTOR.
HERMANN C. SCHUTT

United States Patent Office 2,954,281
Patented Sept. 27, 1960

2,954,281

METHOD AND APPARATUS FOR THE FLUID-IZED CATALYTIC TREATMENT OF FLUID RE-ACTANTS

Hermann C. Schutt, Framingham Center, Mass., assignor to Stone & Webster Engineering Corporation, Boston, Mass., a corporation of Massachusetts Filed Sept. 27, 1954, Ser. No. 458,534

4 Claims. (Cl. 23—288)

This invention relates to methods of and apparatus for the fluidized catalytic treatment of fluidized reactants, the catalyst being in a fluidized solid state; and is of utility especially in the fluidized catalytic treatment of gaseous mixtures of ethylene and oxygen with such catalysts at elevated temperatures and pressures, for the production of ethylene oxide by the direct oxidation of ethylene.

In the usual case, the reactant undergoing treatment is caused to flow upwardly in a confined stream form through a bed of the fluidized catalyst disposed in the fluidized catalytic treating zone. The average residence time of the reactant in the treating zone is a function, in part at least, of the entrance velocity of the reactant stream, the length (or height) of the catalyst bed, and the density of the fluidized catalyst.

At relatively high stream velocities which induce substantial ebullition of the fluidized catalyst in the bed, catalyst may be continuously removed from the catalyst bed by entrainment in the flowing stream and transported thereby out of the treating zone to a separate zone for separation and recovery of catalyst from the reaction products, the separated catalyst being recycled to the catalyst bed.

At relatively low stream velocities and accompanying lesser ebullition of the catalyst bed, transport of catalyst from the treating zone may be substantially avoided if desired. In neither case, however, does the flow of the reactant through the bed correspond to what may be termed "piston flow," that is, a flow wherein the movement of any given unit of the reactant through the bed is analogous to the linear movement of a piston in its cylinder. On the contrary, the reactant stream in transit through the bed undergoes local disturbances and resultant internal directional changes productive of numerous whorls, eddies, and other unstable circulatory patterns within the stream, these patterns being stationary at times along the catalyst bed, or at times displaying a relatively slower movement along the catalyst bed, than the stream as such.

These temporary internal disturbances may be due to absorption effects of the fluidized catalyst on the reactant with coalescence of the discrete catalyst particles into larger particles, lumps, etc. which sooner or later are disrupted and restored to their initial discrete particle state as the reaction proceeds in these local areas to a greater or less degree.

Whatever the mechanism may be precisely, the result is that a given unit of the reactant may be reacted to a greater or less degree than another unit of the reactant. Because of this random internal action in the flowing stream, and the absence of "piston flow" under these conditions, the overall conversion of the reactant in transit through the bed, suffers and the yield of desired product fails to reach an optimum under the reaction conditions.

It is therefore among the objects of this invention to offset the poor conversion under these circumstances and to enable the obtainment of "piston flow" and more efficient and increased conversion of the reactant under a given set of reaction conditions through the provision of the improved method and apparatus of this invention.

It is another object of this invention to create a stable state of fluidization of a catalyst in a tubular reactor. This is of great importance when a sensitive catalyst, high rate of reaction and high heat effects are involved. A stabilized fluidized catalyst is characterized by the uniform dispersion of the reactant and small but intense eddies of the aerated catalyst.

The term "piston flow" is normally used only in connection with a fixed bed catalyst and the activity of a powder catalyst is frequently tested in a stationary state by passing the reactant downwardly through the tube. However, it is appropriate to term the flow of gas through a catalyst in an ideal state of fluidization as "piston flow," inasmuch as the gas over the entire cross-section of the reactor ascends at an even rate and the minute back flow cycles associated with the turbulence phenomenon may be neglected.

The invention consists in disposing a relatively slender helical baffle substantially centrally and vertically of the fluidized catalyst bed. In accordance with this invention, the baffle is of a surface configuration to provide in effect a groove in its surface running generally helically and coaxially of the baffle, the groove being continuous, preferably, from end to end of the baffle, in which sense, the baffle may be termed "helical."

The helical baffle is, preferably, at least coextensive in length with the catalyst bed and, in transverse dimension, is small relative to the transverse dimension of the catalyst bed. Illustratively, the helical baffle for use in a tubular bed of fluidized catalyst may be a helical wire or flat strip helical coil.

The baffle is fabricated of a material, preferably metal, capable of withstanding the high temperatures and severe reaction conditions commonly met with in fluidized catalytic treating operations. Advantageously, it may be fashioned from an 18/8 alloy steel although other alloys and materials will be recognized as suitable by those skilled in the art.

Through the provision of the helical baffle of this invention, "piston flow" of the reactant through the bed of catalyst in its fluidized solid state, is obtainable with resultant increase in overall conversion of the reactant, efficiency of operation, and economies in practice. Moreover, the helical baffle of this invention serves to break up stationary large eddies, prevent back-mixing and slugging of the catalyst, permit high gas flow rates, cause "piston flow" of the reactant within a wide range of superficial velocities, increase heat transfer rate to and from the tube wall, permit the use of larger tubes for a given reaction, prevent agglomeration or caking of a sensitive catalyst, and maintain uniform reaction temperature.

In the accompanying drawings which form part of the instant specification and are to be read in conjunction therewith, and in which like numbers refer to like parts throughout the several views.

Figure 1:
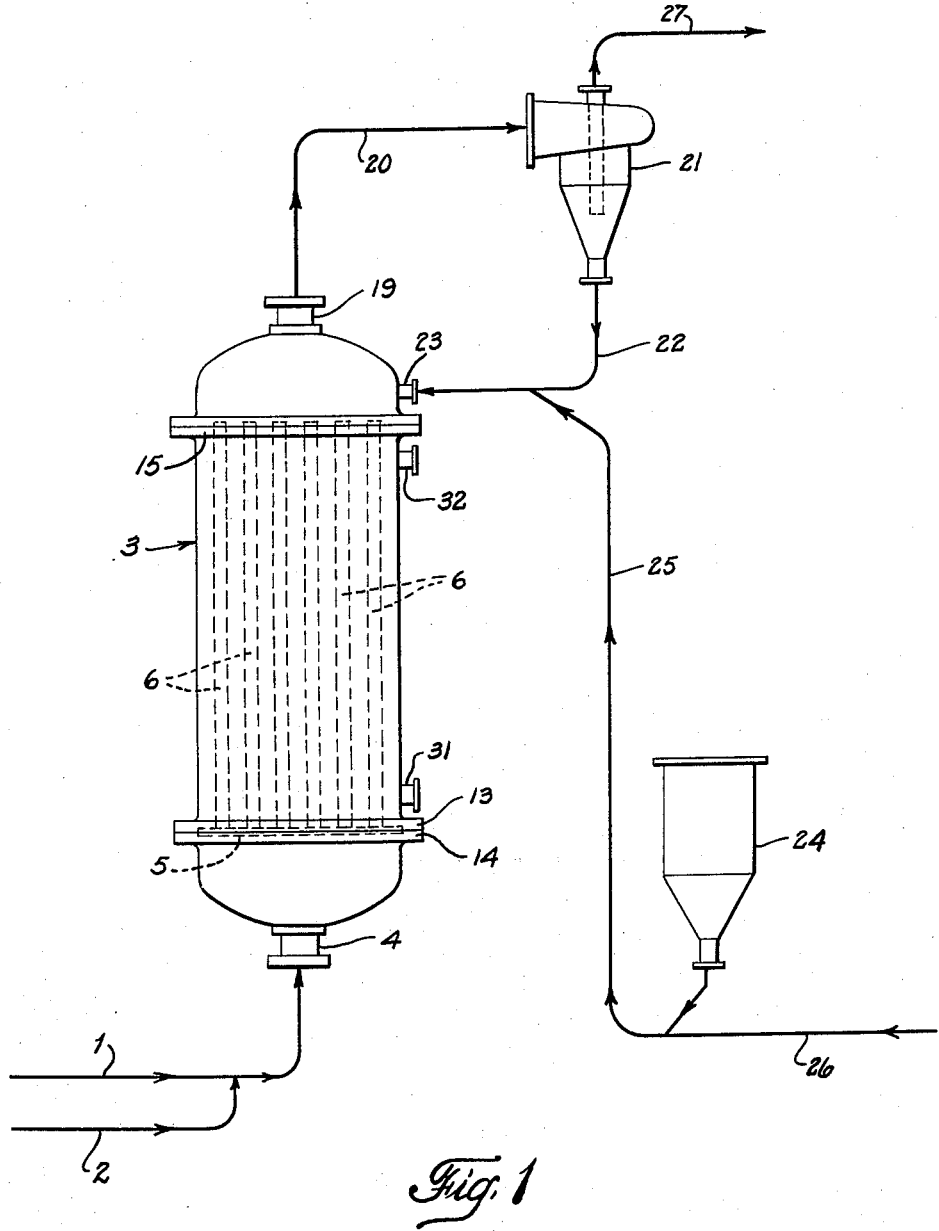
Fig. 1 is a view of the reactor of this invention in a functional apparatus arrangement, suitable for practising the catalytic treating process of this invention.

Referring now more particularly to the drawings, the reactant gas, or a mixture of two or more components supplied via the feed lines 1 and 2 respectively, enters the reactor 3 at the bottom via a gas inlet 4 and passes upwardly through a perforated plate 5 which creates a pressure barrier and causes even distribution of the reactant to all the tubes 6 of the multi-pass reactor 3. Above the perforated plate are layers of ¼″ to ⅜″ diameter steel or ceramic balls 7, in order to distribute uniformly the entering gas over the tube cross-section and also retain the powder catalyst 8, which may be of 80–150 mesh in size, in the tube, and prevent its dropping through the perforations 9 of the gas distributing plate 5 when no gas is flowing.

The reactant gas rises through the catalyst at a uniform velocity and in a "piston flow" fashion, while aerating or fluidizing but not transporting it. The volume of the catalyst increases and its level rises above the top tube sheet 15, depending upon the gas throughput or the degree of aeration.

The lower end of each tube 6 is preferably flared as at 11 and is seated in a flared opening 12 in the lower tube sheet 13 of the reactor. The perforated distributor plate 5 may be secured between the tube sheet 13 and the reactor inlet head 14 so as to maintain it securely in position with respect to the reactor tubes 6.

The upper end of each of the tubes 6 is securely rolled into a heavy tube sheet 15, a multiple arm crown 16 being supported on the tube sheet 15 over the upper end of each tube 6 for the purpose of supporting a helical wire 17 centrally longitudinally of the tube 6 and holding the wire in place. The crown 16 is provided for this purpose with an eye-bolt 18 to which the upper end of the helical wire 17 is attached. Each crown 16 also serves to distribute the reactant issuing from the tube 6 over the whole cross-section of the shell above the tube sheet 15, thus reducing the velocity of the gas when disengaging from the catalyst, and minimizing carry-over of catalyst fines. The wire 17 is attached at its other end to an eye bolt 18′ carrying nut 18″ for tensioning the wire as desired.

The reaction products leaving the reactor through the gas outlet 19 pass via a line 20 to a cyclone 21 wherein fine catalyst particles are separated from the conversion products and returned to the reactor via the line 22 and catalyst return nozzle 23. Fresh catalyst carried in a bin 24 may be supplied to the reactor with the recycle catalyst fines via a line 25, the fresh catalyst being transported from the bin 24 to the reactor return nozzle 23 by means of a suitable transport gas supplied to the system via a line 26 connected to the catalyst supply line 25. Conversion products freed of catalyst fines are delivered from the cyclone 21 via a discharge line 27.

Figure 2:
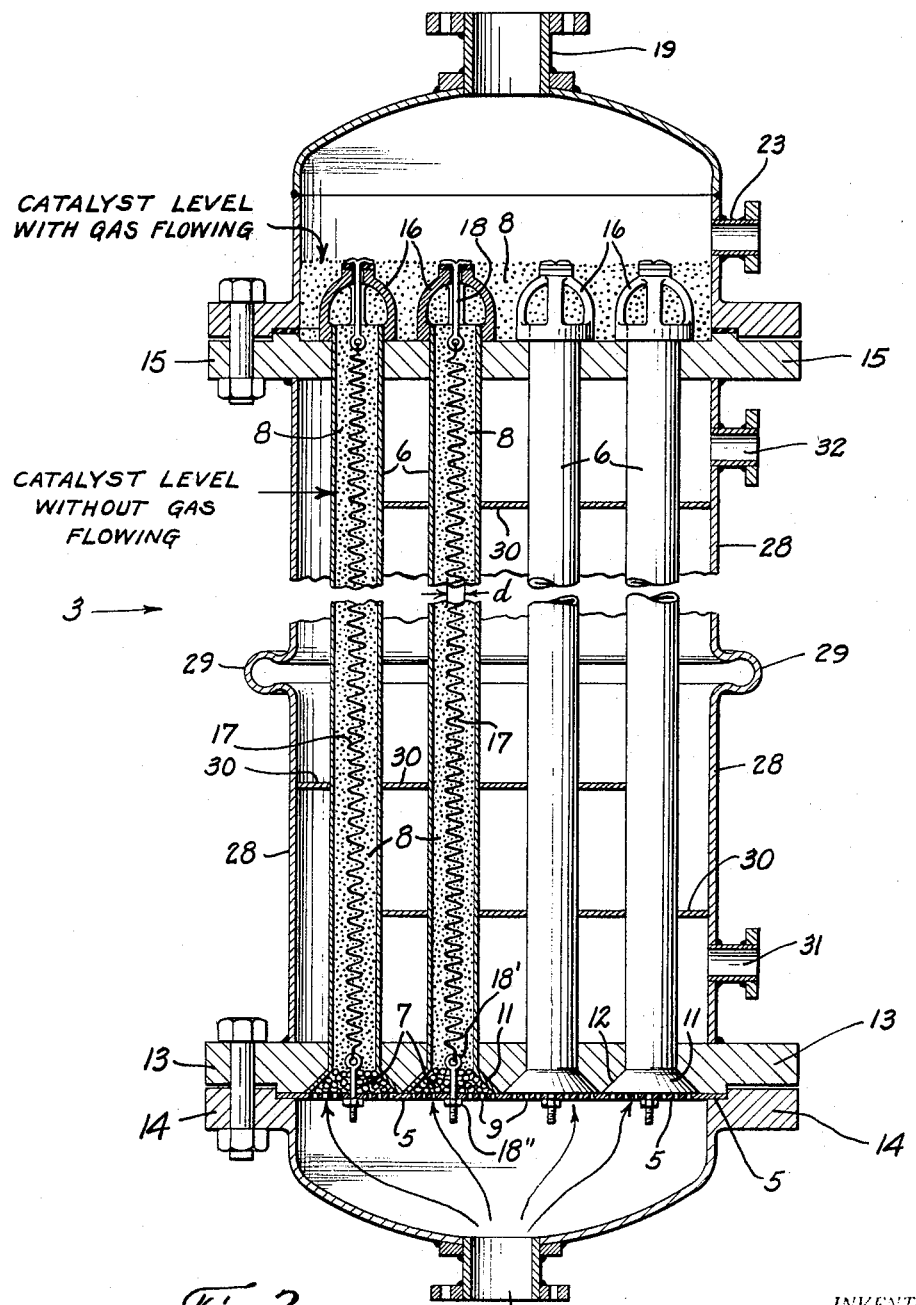
Fig. 2 is a view in sectional elevation of a tubular reactor in accordance with this invention.
Figure 3:
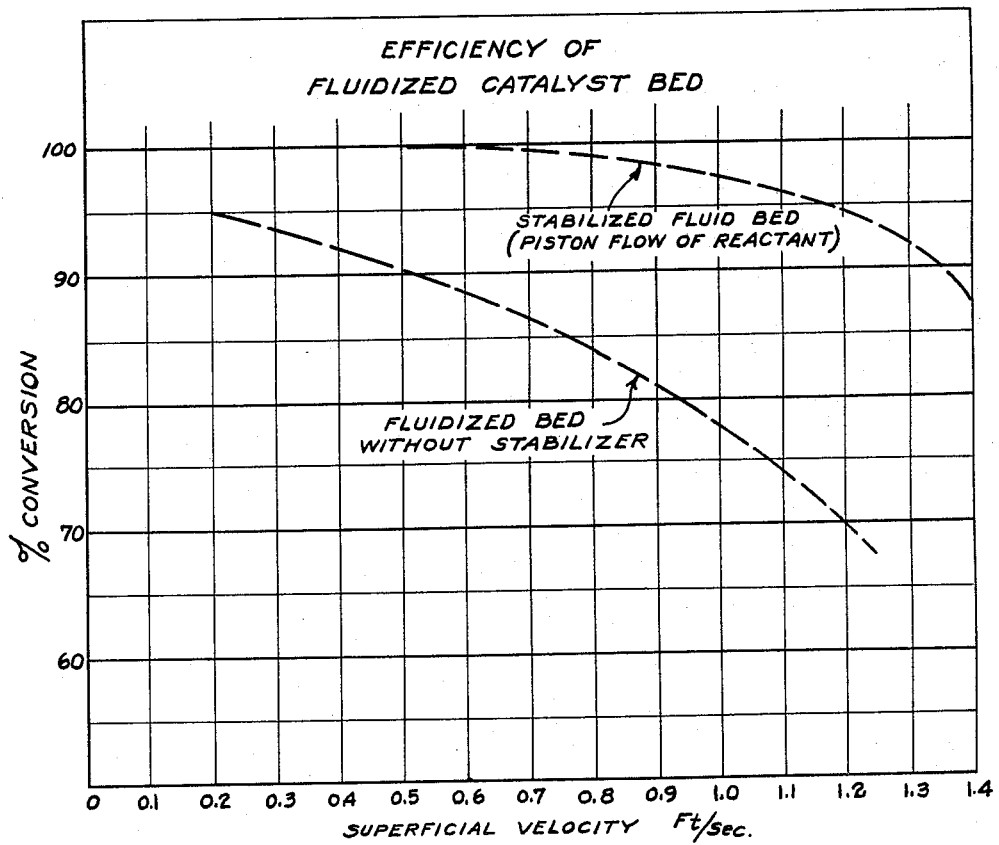
Fig. 3 is a graph illustrating quantitatively the advantages of a stabilized fluid bed in accordance with this invention.

The reactor as illustrated in Fig. 2 is particularly adapted to reactions involving high heat effects, together with a narrow temperature range and where the reaction proceeds in the desired direction and without excessive side reactions. A heating or cooling medium may be passed through the reactor shell 28 which may be provided with an expansion joint 29 and transverse baffles 30 suitably disposed to effect the desired transverse movement of a heating or cooling medium across the reactor tubes 6 from inlet nozzle 31 of the shell to the outlet nozzle 32. The flow of the heating or cooling medium through the shell is at high velocity across the bundle of reactor tubes 6 and may be either concurrent or countercurrent to the flow of the reactant in the tubes, but is preferably concurrent as shown in Fig. 2, as the heat effect is usually the greatest at the beginning of the reaction, where the concentrations of the original reactants are the highest. The medium may also be a condensing vapor or boiling liquid, depending on whether heat must be added or removed.

The cross-sectional area of the helical baffle formed by the helical wire 17 is relatively small compared to the cross-sectional area of the tube in which it is disposed. The following table is illustrative of dimensional parameters of the baffle for tube sizes of various diameters:

*Baffle dimensions*

| Tube Size I.D. Inch | Spiral Dia. "d" | Windings Per Foot | Wire Gage, BWG |
|---|---|---|---|
| 1½″ | ⅝ | 15 | 19 |
| 2″ | ½ | 10 | 15 |
| 3″ | ⅛ | 6 | 11 |

The reactor is suitable for a multitude of oil refining processes, such as cracking, dehydrogenation, isomerization, alkylation and polymerization of hydrocarbons. The reactor is also efficient in hydrogenation, oxidation, halogenation, carbonylization of hydrocarbons and other organic chemicals, as well as in numerous reactions or interactions of two or more chemical compounds. The direct oxidation of ethylene constitutes a typical example of a reaction involving a sensitive catalyst, a limited operating temperature range and a high exothermic reaction.

The invention in its broader aspects is not limited to the specific steps, combinations and improvements described but departures may be made therefrom within the scope of the accompanying claims without departing from the principles of the invention and without sacrificing its chief advantages.

What is claimed is:

1. In the process of effecting the catalytic conversion of gaseous reactants into desired products of reaction by the upward passage of said gaseous reactants through an upstanding, vertically elongated tubular reaction zone containing a solid particle mass of powdered catalyst, at a linear rate effective to support the solid particle catalyst as a dense fluid phase of substantial vertical height within the reaction zone such that the contact between the reactants and the fluidized catalyst is sufficient to effect substantial conversion into desired products of reaction, the improvement which comprises creating a stable state of fluidization of the catalyst in the reaction zone by disposing in spaced relationship to the outer perimeter of the reaction zone and centrally of the path of flow of the ascending stream, along substantially the entire length of the central core of the vertical section of the dense fluid phase of catalyst, a relatively slender, stationary, continuous helical baffle which, in transverse dimension, is small relative to the transverse dimension of the reaction zone and occupies only a relatively small central portion of the transverse cross-sectional area of said stream so that the reactant gas will ascend at an even rate over substantially the entire horizontal cross-section of the elongated tubular reaction zone, and withdrawing products of reaction from contact with the fluid phase of catalyst from the upper portion thereof.

2. A tubular reactor for effecting the catalytic conversion of gaseous reactants into desired products of oxidation comprising a reaction tube for containing a solid particle mass of powdered catalyst, and a relatively slender stationary helical baffle disposed in and extending substantially coaxially of said tube along substantially the entire length of the central portion thereof and in uniformly annularly, substantially spaced relation thereto, for providing a thin, central, helical core in said catalyst mass free from contact with the side wall of said tube, said baffle, in transverse dimension, being small relative to the transverse dimension of the tube and occupying only a relatively small central portion of the transverse cross-sectional area of said tube.

3. A tubular reactor in accordance with claim 2 in which the helical baffle is a helical wire having substantially the same diameter throughout its longitudinal length.

4. A tubular reactor in accordance with claim 2 in which the helical baffle is a flat strip helical coil.

References Cited in the file of this patent

UNITED STATES PATENTS

| | | |
|---|---|---|
| 2,492,349 | Beck et al. | Dec. 27, 1949 |
| 2,540,706 | Beck et al. | Feb. 6, 1951 |
| 2,542,587 | Smith | Feb. 20, 1951 |
| 2,637,629 | Lewis | May 5, 1953 |